July 28, 1964  D. A. NELSON  3,142,330
MACHINE FOR UNSEATING TIRE BEADS
Filed April 25, 1962  2 Sheets-Sheet 1

Donald A. Nelson
INVENTOR.

July 28, 1964     D. A. NELSON     3,142,330
MACHINE FOR UNSEATING TIRE BEADS
Filed April 25, 1962     2 Sheets-Sheet 2
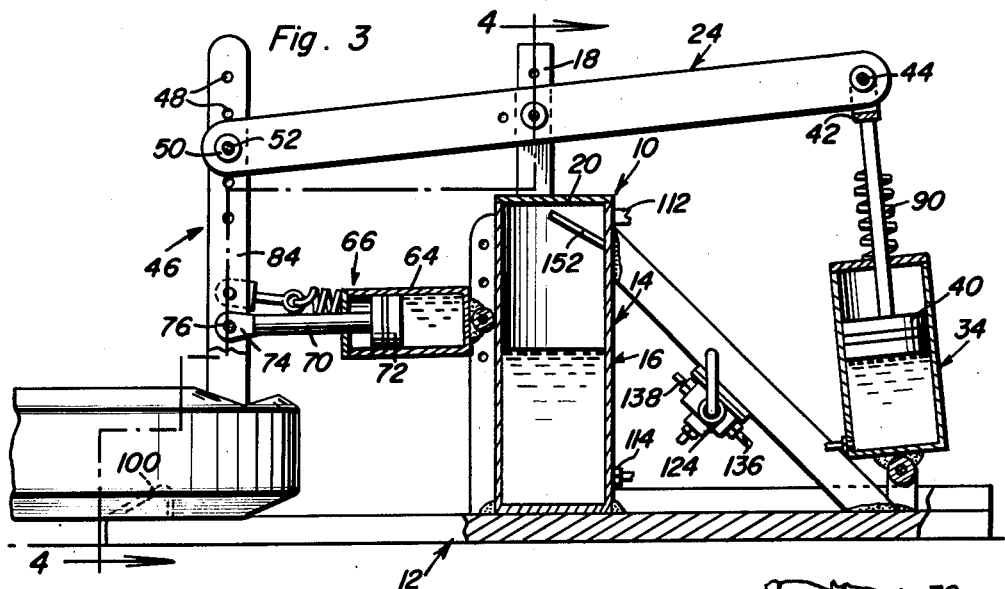
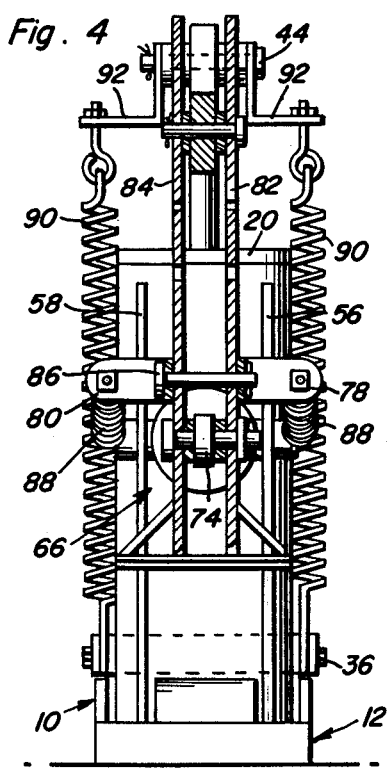
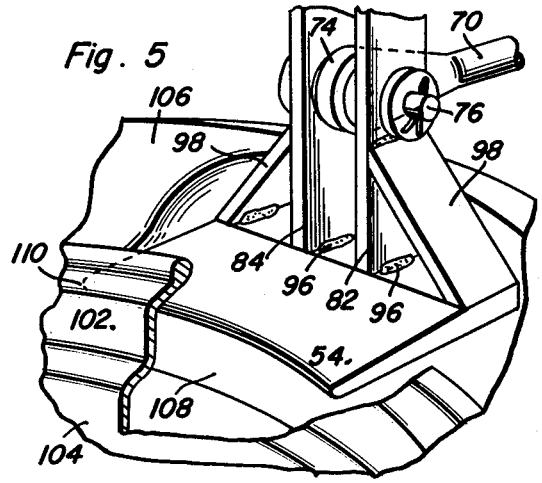
Donald A. Nelson
*INVENTOR.*

United States Patent Office 3,142,330
Patented July 28, 1964

3,142,330
MACHINE FOR UNSEATING TIRE BEADS
Donald A. Nelson, P.O. Box 340, Ruthven, Iowa
Filed Apr. 25, 1962, Ser. No. 190,006
9 Claims. (Cl. 157—1.17)

This invention relates to a novel and useful machine for unseating tire beads and more specifically to a machine designed primarily for the purpose of unseating the beads on the opposite sides of a tire casing from a vehicle wheel against whose flanges the beads of the tire casings are seated.

The machine of the instant invention includes a base portion from which an upright standard projects and a walking beam or lever is pivotally secured to the upper end of the standard at a point intermediate the opposite ends of the beam and an extensible fluid motor is secured between one end of the walking beam and the base of the standard while the upper end of a depending pressure leg is pivotally secured to the other end of the beam. The lower end of the depending pressure leg is provided with a laterally directed foot portion which is adapted to slip between a wheel flange and the tire casing bead seated thereagainst as downward pressure is effected by the pressure leg on the tire casing immediately adjacent the upper flange of the wheel on which it is mounted.

A second extensible fluid motor is secured between the standard and the free end of the depending pressure leg and may be utilized to apply a force against the lower end of the depending pressure leg in a direction to which the foot portion thereon projects.

Each of the fluid motors is of the single acting type and means are interconnected between the base and the standard and the end of the beam remote from the pressure leg and the lower end of the pressure leg respectively for normally urging the last mentioned end of the beam toward the base and the lower end of the pressure leg toward the standard. A fluid pressure reservoir is provided and fluid pressure lines communicate the pressure reservoir with the pair of extensible fluid motors for actuation of the latter. A control valve is disposed in the fluid pressure line leading from the fluid reservoir and is provided with two outlets which are communicated with the extensible fluid motors. The control valve is provided with a movable actuator which may be reciprocated between various predetermined positions for actuating and venting the fluid motors. The movable actuator is constructed in a manner whereby the first fluid motor may be actuated to pivot the walking beam and thereafter have its communication with the fluid reservoir terminated and then subsequently utilized to effect actuation of the second fluid motor in order that the latter may urge the laterally directed foot portion of the depending pressure leg between a tire casing bead and a wheel flange against which it is seated after the tire casing has been partially depressed. The preceding sequential operation of the aforementioned components of the machine may be carried out by moving the reciprocal actuator of the control valve in one direction. Thereafter, the actuator may be moved in an opposite direction to vent both of the extensible fluid motors in order that the resilient means for retracting the extensible fluid motors may be rendered effective.

The main object of this invention is to provide a machine for unseating tire beads which will be capable of unseating tire beads from wheel flanges in an expeditious manner and with a minimum amount of effort.

A further object of this invention, in accordance with the immediately preceding object, is to provide a machine for unseating tire beads from the flanges of a vehicle wheel that may be readily actuated by means of a source of fluid under pressure such as a source of air pressure normally available in shops and garages where tire work is performed.

A still further object of this invention is to provide a novel control for the extensible fluid motors of the machine that may be utilized to effect the desired sequential functions with a minimum amount of control manipulation.

A final object to be specifically enumerated herein is to provide a machine for unseating tire beads which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a vertical sectional view taken substantially upon a plane passing through the center of the tire changing machine and showing the various component parts thereof in operating positions which are different from those illustrated in FIGURE 2;

FIGURE 4 is an enlarged fragmentary vertical sectional view taken substantially upon the plane indicated by section line 4—4 of FIGURE 3;

Figure 6:
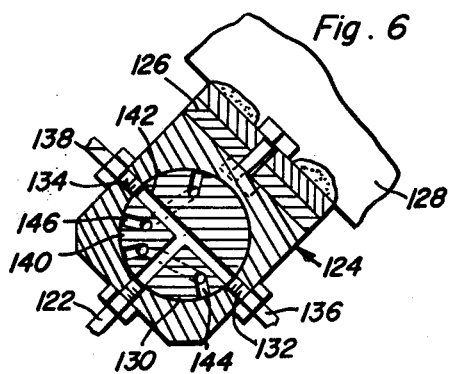

FIGURE 5 is an enlarged fragmentary perspective view of a portion of a vehicle wheel and tire casing shown with the pressure leg of the instant invention being utilized to urge a portion of the bead of the tire casing away from the associated wheel flange, portions of the vehicle wheel being broken away and shown in section; and FIGURE 6 is an enlarged fragmentary sectional view taken through the control valve of the machine.

Figure 1:
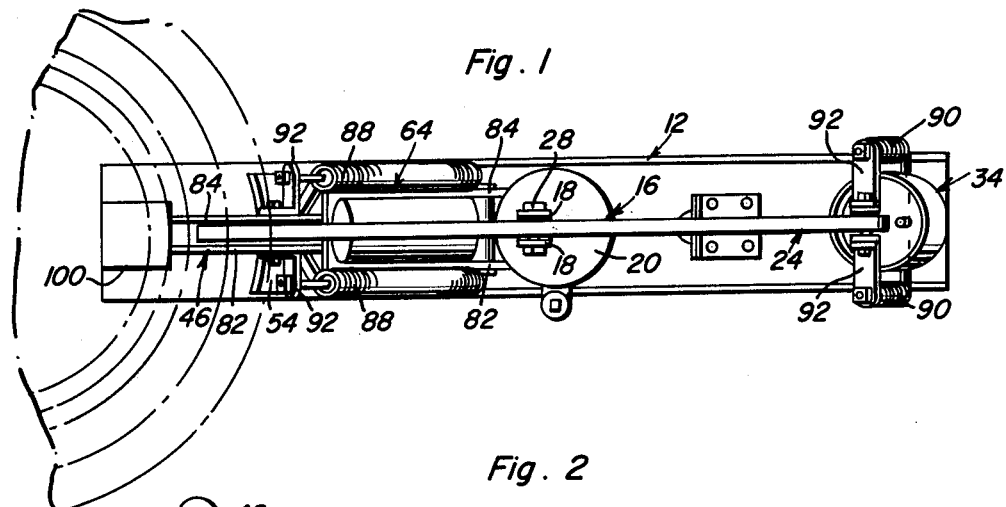
FIGURE 1 is a top plan view of the machine which comprises the instant invention showing a vehicle wheel and tire casing operatively associated therewith in phantom line.
Figure 2:
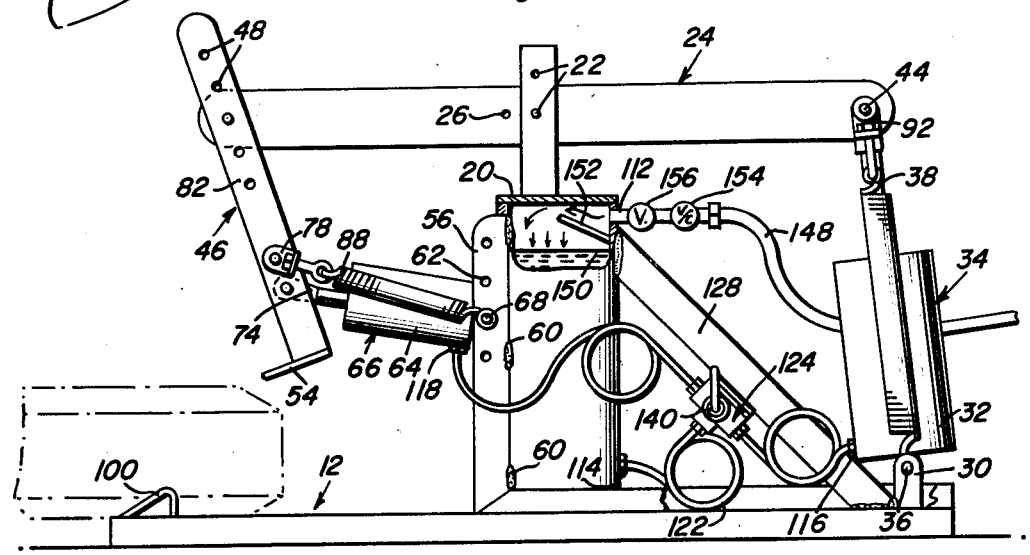
FIGURE 2 is a side elevational view of the embodiment illustrated in FIGURE 1 and with parts thereof being broken away and shown in section.

Referring now more specifically to the drawings and to FIGURES 1 through 3 in particular, it will be seen that the machine of the instant invention is generally designated by the reference numeral 10 and that it includes a base generally referred to by the reference numeral 12 from which an upright standard generally referred to by the reference numeral 14 projects. The standard 14 includes a lower portion defining a generally cylindrical fluid reservoir generally referred to by the reference numeral 16. The upper portion of the standard 14 comprises a pair of upright arms 18 which are affixed to the top wall 20 of the reservoir 16 in any convenient manner and are provided with suitable pairs of aligned apertures 22. The pairs of aligned apertures 22 are vertically spaced and an elongated lever or walking beam generally referred to by the reference numeral 24 is provided and includes a pair of longitudinally spaced bores 26 adjacent its mid portion by which the beam 24 may be pivotally secured to the upper end of the standard 14. A pivot fastener 28 is secured through a selected one of the pairs of apertures 22 formed in the upright arms 18 and a predetermined one of the bores 26.

A bifurcated mount 30 is carried by one end of the base 12 and the cylinder 32 of a fluid motor generally referred to by the reference numeral 34 has one end pivotally secured to the bifurcated mount 30 by means of a pivot pin 36. The fluid motor 34 includes a piston rod 38 having a piston 40 on one end slidably received within the cylinder 32 and a bifurcated member 42 on the other end which is pivotally secured to the corresponding end of the beam 24 by means of a pivot fastener 44.

An elongated depending pressure leg generally referred to by the reference numeral 46 has a plurality of longitudinally spaced bores 48 formed in one end and the end of the beam 24 remote from the fluid motor 34 is provided with a bore 50. A pivot fastener 52 is secured through a selected one of the bores 48 and the bore 50 to pivotally secure the upper end of the pressure leg 46 to the corresponding end of the beam 24.

The lower end of the pressure leg 46 includes a laterally directed foot portion 54 which projects away from the standard 14 and it may be seen from FIGURES 2 through 4 of the drawings that a pair of laterally spaced flanges 56 and 58 are secured to the side of the fluid reservoir 16 adjacent the pressure leg 46 in any convenient manner such as by welding 60. The flanges 56 and 58 are provided with pairs of aligned apertures 62 and one end of the cylinder 64 of the fluid motor generally referred to by the reference numeral 66 is pivotally secured between the flanges 56 and 58 by means of a pivot fastener 68. The fluid motor 66 also includes a piston rod 70 which has a piston 72 on one end slidably received within the cylinder 64 and an apertured member 74 on the other end which is pivotally secured to the lower end portion of the pressure leg 46 by means of a pivot fastener 76. In addition, it will be seen that a pair of brackets 78 and 80 are pivotally secured to the pair of leg members 82 and 84 which comprise the pressure leg 46 by means of a pivot fastener 86. One end of an expansion spring 88 is secured to each of the brackets 78 and 80 and the ends of the springs 88 remote from the brackets 78 and 80 are pivotally secured to the fluid reservoir 16 by means of the pivot pin or fastener 68. In this manner, it may be seen that the fluid motor 66 is normally urged toward a retracted or collapsed position.

A pair of expansion springs 90 each have one end secured to a bracket 92 which is carried by a corresponding end of the pivot pin or fastener 44 and the remote ends of the springs 90 are secured to the bifurcated mount 30 by means of the pivot pin or fastener 36.

With attention now directed to FIGURE 5 of the drawings it may be seen that the laterally directed foot portion 54 is secured to the lower ends of the legs 82 and 84 in any convenient manner such as by welding 96 and that additional diagonal brace members 98 are secured between the opposite sides of the foot portion 54 and the corresponding leg at a point a spaced distance from the foot portion 54.

It may be seen from FIGURES 1 through 3 of the drawings that the base 12 projects considerably from opposite sides of the standard 14 and that it is provided at its free end portion disposed beneath the pressure leg 46 with a stop bracket 100 for engagement with either one of the flange portions 102 of the vehicle wheel 104.

The tire casing 106, see FIGURE 5, is provided with a pair of bead portions 108 which are annular and which seat against the outermost generally radial retaining flanges 110 of the wheel 104.

The fluid reservoir 16 includes an inlet 112 and an outlet 114. Additionally, the fluid motor 34 includes fluid inlet means 116 and the fluid motor 66 includes fluid inlet means 118. A fluid pressure line 122 is provided and communicates the fluid outlet 114 with the control valve generally referred to by the reference numeral 124. The control valve 124 includes a base portion 126 which may be secured to any suitable portion 128 of the machine 10 and the control valve 124 includes a central bore 130 with which the fluid pressure line 122 is communicated at its end remote from the fluid reservoir 16. A pair of pressure outlets 132 and 134 are also communicated with the central bore 130 and a pair of fluid lines 136 and 138 communicate the pressure outlet 132 and the inlet 116 and the pressure outlet 134 with the pressure inlet 118 respectively. An actuator for the control valve 124 designated by the reference numeral 140 is rotatably received in the bore 130 and includes a T-shaped venting passage 142 and a pair of C-shaped passages 144 and 146. The T-shaped passage 142 may be rotated into position communicating the pressure outlets with the fluid pressure line 122 and the C-shaped passages 144 and 146 may be utilized to communicate the pressure outlets 132 and 134 respectively with the fluid pressure line 122.

A second fluid pressure line or supply line 148 is provided and it has one end communicated with the inlet 112 of the fluid reservoir 16. A quantity of hydraulic fluid or similar liquid 150 is disposed in the lower portion of the fluid reservoir 16 and a baffle 152 is secured in the upper end of the fluid reservoir 16 in order that compressed air entering the fluid reservoir 16 by means of the inlet 112 will not cause foaming of the hydraulic fluid 150. The end of the supply line 148 remote from the inlet 112 may of course be connected to any suitable source of air under pressure and a control valve 154 is disposed in the supply line 148. In addition, a vent valve 156 is disposed in the supply line 148 between the control valve 154 and the inlet 112. In operation, the machine 10 may be erected so that the beam 24 is of the desired heighth above the top wall 20. In addition, inasmuch as the bores 26 are spaced longitudinally of the beam 24, the effective length of one end of the beam 24 on one side its axis of rotation may be increased or decreased as desired. Then, the pressure leg 46 may also have its axis of rotation adjusted as desired. Then, assuming that the tire casing 106 is positioned as illustrated in FIGURE 3 of the drawings and the fluid motor 66 is partially extended as shown in FIGURE 3 of the drawings, the fluid motor 34 may be actuated in order to force the end of the beam 24 to which the pressure leg 46 is secured downwardly. This will of course depress the portion of the tire casing 106 with which the foot portion 54 is engaged. After the tire casing 106 has been initially depressed, the actuator 140 may be rotated in a counterclockwise direction as viewed in FIGURE 6 of the drawings slightly past a position which would enable the C-shaped passage 144 to communicate the pressure outlet 132 with the fluid pressure line 122. At this point, the point at which the fluid pressure line 122 communicates with the bore 130 would be positioned between the adjacent ends of the C-shaped passages 144 and 146. Then, further counterclockwise rotation of the actuator 140 may be effected in order to communicate the pressure outlet 134 with the fluid pressure line 122, thereby effecting extension of the fluid motor 66 and movement of the foot portion 54 between the depressed portion of the tire casing 106 and the associated portion of the retaining rim 110. Thereafter, the actuator 140 may be rotated in a clockwise direction in order that the C-shaped passage 144 will again communicate the pressure outlet 132 with the fluid pressure line 122 effecting further extension of the fluid motor 34 and depression of the portion of the tire casing 106 with which the foot portion 54 is engaged. After the tire casing bead 108 has been unseated from engagement with the retaining flange 110, the actuator 140 may be returned to the position illustrated in FIGURE 6 of the drawings in order to vent both the fluid motors 34 and 66 after the control valve 154 has been closed and the vent valve 156 has been opened.

Before again using machine 10, it will of course be necessary to close the vent valve 156 and then open the control valve 154 to again charge the interior of the fluid reservoir 16 with air under pressure above the hydraulic fluid 150. Then, the fluid motors 34 and 66 may again be actuated as previously set forth.

The foregoing is considered as illustrative only of the principles of the invention. Further, since numerous modifications and changes will readily occur to those skilled in the art, it is not desired to limit the invention to the exact construction and operation shown and de-

What is claimed as new is as follows:

1. A machine for unseating a tire bead from a wheel flange against which the bead is seated, said machine comprising a base, a standard supported from said base, a walking beam pivotally secured to the upper end of said standard for rotation about a generally horizontally disposed axis, elongated extensible motor means pivotally secured at opposite ends to said base and one end of said beam for oscillation about axes generally paralleling the axis of rotation of said beam, a depending pressure leg pivotally secured to the other end of said beam for rotation about an axis generally paralleling said axis of rotation of said beam and including a lower end laterally directed foot portion adapted at its free end to be slipped between a tire bead and the wheel flange against which it is seated, said foot portion projecting transversely of said axes, an elongated extensible motor means pivotally supported at opposite ends from said base and the lower free end of said pusher leg for oscillation about axes generally paralleling the axis of rotation of said beam.

2. The combination of claim 1 wherein each of said extensible motor means comprises a single action fluid motor extensible by fluid pressure, means normally resiliently urging said fluid motors toward shortened positions.

3. The combination of claim 2 including fluid inlet means operatively communicated with each of said fluid motors, valve means including a pair of pressure outlets communicated with said fluid inlet means and a single bleed-off and supply outlet, said valve means including a movable actuator movable consecutively between a position communicating said pressure outlets with said supply outlet, communicating one of said pressure outlets with said supply outlet, and communicating the other of said pressure outlets with said supply outlet.

4. The combination of claim 3 including a fluid reservoir having an outlet communicated with said supply outlet.

5. The combination of claim 4 including a fluid pressure line having one end communicated with said fluid reservoir above said reservoir outlet, a control valve disposed in said fluid pressure line, and a vent valve disposed in said fluid pressure line between said reservoir and said control valve.

6. The combination of claim 1 wherein said standard includes means for vertically adjusting the axis of rotation of said beam.

7. The combination of claim 1 wherein said pressure leg includes means for adjustably positioning its axis of rotation relative to said beam longitudinally along said leg.

8. The combination of claim 1 wherein said base includes positioning means adapted to engage and properly position a wheel flange relative to said pressure leg.

9. For use with a machine for unseating a tire bead from a wheel flange against which the bead is seated, said machine comprising a base, a standard supported from said base, a walking beam pivotally secured to the upper end of said standard for rotation about a generally horizontally disposed axis, a depending pressure leg pivotally secured to one end of said beam for rotation about an axis generally paralleling said axis of rotation of said beam and including a lower end laterally directed foot portion adapted at its free end to be slipped between a tire bead and the wheel flange against which it is seated; elongated extensible fluid motor means adapted to be pivotally secured at opposite ends to said base and one end of said beam for oscillation about axes generally paralleling the axis of rotation of said beam, elongated extensible fluid motor means adapted to be pivotally secured at opposite ends to said base and the lower free end of said pressure leg for oscillation about axes generally paralleling the axis of rotation of said beam, each of said motor means comprising a single action fluid motor extensible by fluid pressure, means normally resiliently urging said fluid motors toward shortened position, fluid inlet means operatively communicating with each of said fluid motors, valve means including a pair of pressure outlets communicating with said fluid inlet means and a single lead-off and supply outlet, said valve means including a movable actuator movable consecutively between a position communicating said pressure outlets with said supply outlet, communicating one of said pressure outlets with said supply outlet, and communicating the other of said pressure outlets with said supply outlet.

References Cited in the file of this patent

UNITED STATES PATENTS

| | | |
|---|---|---|
| 1,124,316 | Pfleumer | Jan. 12, 1915 |
| 2,537,189 | King | Jan. 9, 1951 |
| 2,749,975 | Curtis | June 12, 1956 |
| 2,818,108 | Wells | Dec. 31, 1957 |
| 2,898,977 | Denn | Aug. 11, 1959 |
| 2,920,664 | Lomen et al. | Jan. 12, 1960 |
| 3,032,095 | Brosene | May 1, 1962 |